(12) United States Patent
Shi

(10) Patent No.: US 11,556,119 B2
(45) Date of Patent: Jan. 17, 2023

(54) SYSTEM AND METHOD FOR IMPROVING SIMULATION ACCURACY OF MANUFACTURING PLANTS

(71) Applicant: Weiping Shi, College Station, TX (US)

(72) Inventor: Weiping Shi, College Station, TX (US)

( * ) Notice: Subject to any disclaimer, the term of this patent is extended or adjusted under 35 U.S.C. 154(b) by 587 days.

(21) Appl. No.: 16/573,990

(22) Filed: Sep. 17, 2019

(65) Prior Publication Data
US 2020/0096981 A1   Mar. 26, 2020

Related U.S. Application Data

(60) Provisional application No. 62/733,789, filed on Sep. 20, 2018.

(51) Int. Cl.
G05B 19/418   (2006.01)

(52) U.S. Cl.
CPC . G05B 19/41885 (2013.01); G05B 19/41865 (2013.01); *G05B 2219/45031* (2013.01)

(58) Field of Classification Search
CPC ........ G05B 19/41885; G05B 19/41865; G05B 2219/45031; Y02P 90/02; Y02P 90/80
See application file for complete search history.

(56) References Cited

U.S. PATENT DOCUMENTS

| | | | |
|---|---|---|---|
| 6,434,440 B1 * | 8/2002 | Teranishi | G06Q 10/06 700/121 |
| 7,653,451 B2 * | 1/2010 | Denton | G05B 19/41865 700/99 |
| 2005/0234579 A1 * | 10/2005 | Asmundsson | G06Q 10/06 700/99 |
| 2006/0106477 A1 * | 5/2006 | Miyashita | G05B 19/41885 700/103 |

OTHER PUBLICATIONS

Scholl, W., et al. "Towards Realization of a High-Fidelity Simulation Model for Short-Term Horizon Forecasting in Wafer Fabrication Facilities" IEEE Proceedings of 2010 Winter Simulation Conf., pp. 2563-2574 (2010) (Year: 2010).*

Akhavan-Tabatabaei, R. & Salazar, C. "Effective WIP Dependent Lot Release Policies: A Discrete Event Simulation Approach" IEEE Proceedings of 2011 Winter Simulation Conf., pp. 1971-1980 (2011) (Year: 2011).*

(Continued)

*Primary Examiner* — Jay Hann
(74) *Attorney, Agent, or Firm* — Zhong Law, LLC

(57) ABSTRACT

A method to simulate operations of a manufacture plant comprising a plurality of machines, the method including receiving a capacity function and an elapsed time function associated with a first machine of the plurality of machines, wherein the capacity function and elapsed time function is defined by one or more parameters characterizing the first machine, receiving a record of historical production data associated with the first machine, calculating, based on the capacity function and the record of historical production data, an augmented capacity function and an augmented elapsed time function that is defined by the one or more parameters and a quantity relating to parts waiting for processing (WIP), and simulating the operations of the plant based on the augmented capacity function and augmented elapsed time function.

16 Claims, 4 Drawing Sheets

(56) References Cited

OTHER PUBLICATIONS

Mhiri, E., et al. "A Step Toward Capacity Planning at Finite Capacity in Semiconductor Manufacturing" IEEE Proceedings of 2014 Winter Simulation Conf., pp. 2239-2250 (2014) (Year: 2014).*
Bagchi, S., et al. "A Full-Factory Simulator as a Daily Decision-Support Tool for 300mm Wafer Fabrication Productivity" IEEE Proceedings of 2008 Winter Simulation Conf., pp. 2021-2029 (2008) (Year: 2008).*

* cited by examiner

SYSTEM AND METHOD FOR IMPROVING SIMULATION ACCURACY OF MANUFACTURING PLANTS

CROSS-REFERENCE TO RELATED APPLICATION

This application claims priority to U.S. Provisional Application 62/733,789 filed Sep. 20, 2018, the content of which is incorporated by reference in its entirety.

TECHNICAL FIELD

The present disclosure relates to a system and method to control the manufacture process of semiconductor products, in particular, to a system and method that may improve the simulation accuracy of manufacture plants.

BACKGROUND

A plant may include different types of machines to perform a series of steps of a manufacturing process that produces the eventual products. For example, the manufacture process to fabricate semiconductor products may include the steps of wet clean, photolithography, ion implantation, dry etching, wet etching, plasma ashing, thermal treatments, chemical vapor deposition (CVD), physical vapor deposition (PVD), molecular beam epitaxy (MBE), electrochemical deposition (ECD), chemical-mechanical planarization (CMP), wafer testing, and wafer back grinding. Each of these steps (or sub-steps) may be performed once or repeatedly during the manufacture process. Each step may be performed by one or more semiconductor manufacture machines (or groups of machines), and each machine may participate in one or more than one steps. Thus, a piece of raw wafer may undergo the steps (and sub-steps) of the manufacture process to produce the eventual products (e.g., the ICs).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
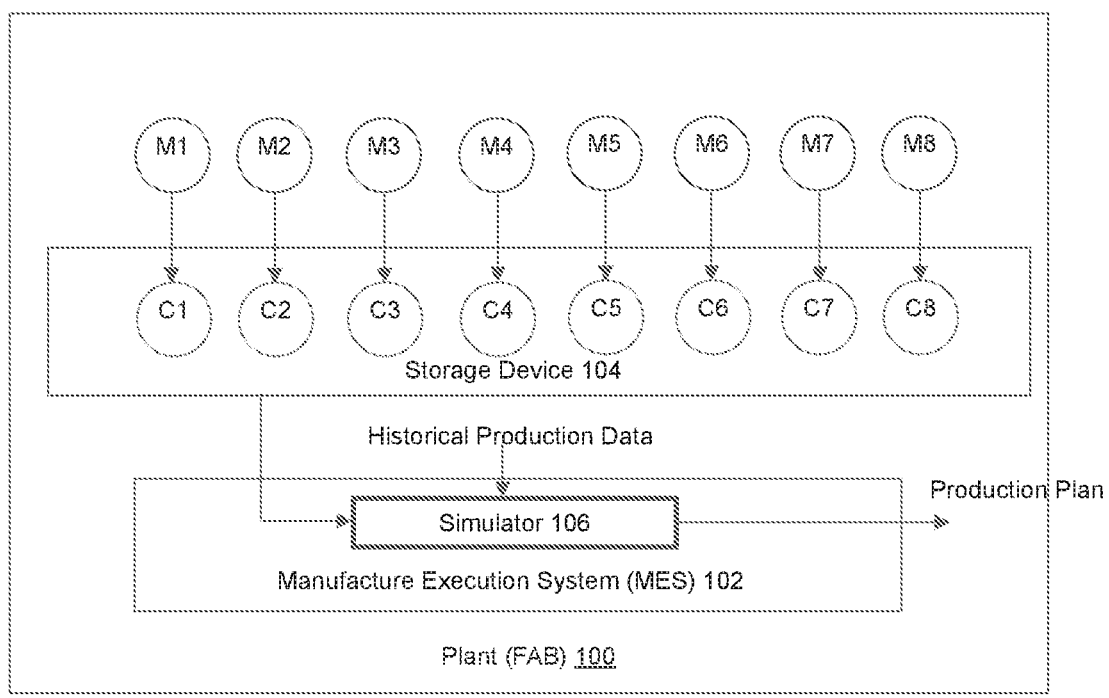
FIG. 1 illustrates a system that employs the augmented capacity functions to simulate a semiconductor manufacture plant according to an implementation of the disclosure.

In one particular example, the plant may be a semiconductor manufacture plant (referred to as a FAB). The manufacture parts can be semiconductor wafers that undergo different manufacture steps to produce integrated circuits (ICs). These wafers or ICs can be the final products of the FAB. Normally, an apparatus may carry up to 25 semiconductors wafers that can be processed and transported together. The wafers in the apparatus are referred to as a wafer lot.

A semiconductor manufacture plant may utilize hundreds to thousands of machines to produce hundreds to thousands of wafers or IC products concurrently through one or more manufacture processes. For each product, there may be hundreds to thousands of wafers or wafer lots, that all go through the same or similar manufacture process. The manufacture process of each product may include hundreds of steps (or sub-steps) needed for fabricating these products. Different types of machines may be employed by different steps. A same type of machines can also be utilized to perform different steps in the manufacture process. Thus, the production capacity of a machine may be divided to meet the demands to perform different steps of the manufacture process, and the processing of each step may be carried out by a group of machines with varying capacity assigned to the step.

Any operation of the FAB such as starting new wafers, turning off a machine to perform maintenance, selecting a certain product to process at a certain machine, etc., may cause costly mistakes. The mistakes can be that a wafer becomes defective, an expensive machine becomes idle, or a product completion time is delayed. To reduce the risk of causing costly mistakes in operating the FAB, the operation of the FAB is commonly simulated in advance before turning on the actual operation. A simulator may be implemented on a computer system to mimic the operation of the FAB. The simulation may help identify issues in operating the FAB, thus improving the operational efficiency and avoiding mistakes. The simulation may include simulation of the machine operations in the FAB.

The simulator may include a model for each machine or a group of machines that perform similar tasks. The model may characterize each machine with a certain capacity to process a certain number of wafers (or a certain number of wafer lots) associated with one or more manufacture steps for a duration of time (e.g., an hour or a day). The manufacture process may employ a sequence of manufacture steps in which a wafer is processed. At each step, the machines (or the machine group) assigned to the step may receive wafers or wafer lots that had been processed by machines used by the previous steps, and may produce the wafers for the next steps.

In some implementations, the simulator may use a capacity function C(M, P, S) to represent the capability for a particular machine M to process a particular manufacture step S for a particular product P. The capacity may be measured in terms of the number of Wafers Per Hour (WPH), or the number of minutes per wafer (m/wafer) or the number of minutes per lot (m/lot). The capability function C(M, P, S) defines the speed at which machine M can process the wafers of a particular step S of a particular product P, assuming there are sufficient wafers waiting to be processed. M, P, and S are parameters that characterize the capacity. For a machine, its capacity for processing different steps of different products may be different.

Sometimes, a particular step S of a particular product P may be defined in the form of a recipe R. A recipe may include the steps for processing and eventually produce a product. Different steps of different products may share a common recipe. The capacity of a particular machine M to process a particular recipe R may also be defined by a capacity function C(M, R) without specifically specifying the product or step because the process is uniquely determined by the machine M and the recipe R.

A machine may include several chambers or sub-systems that form an internal processing pipeline. For example, a machine may include two pipelined chambers A and B, where wafers may first enter chamber A and then go to chamber B before exiting the machine. When some wafers are processed in chamber A, other wafers that had already been processed in chamber A may be concurrently processed in chamber B. For each machine that has internal pipelines, the capacity of the machine is defined as the maximum rate at which the machine can process the wafers. For example, if chambers A and B take respectively 10 minutes and 20 minutes to process each wafer, then the capacity of the machine is one wafer every 20 minutes, or Wafer Per Hour (WPH)=3. In general, the capacity of a pipeline machine equals the capacity of the slowest sub-system, in this case chamber B.

In a pipeline machine, the time each wafer stays in the machine may vary, which is called elapsed time. In the above example, a wafer first takes 10 minutes in chamber A. When finished, if chamber B is empty, it takes another 20 minutes to process the wafer in chamber B. Therefore, the elapsed time of the wafer through the machine is 10 minutes (processed by chamber A)+20 minutes (processed by chamber B)=30 minutes. However, if when the wafer enters chamber A, another wafer starts processing at chamber B, then the elapsed time of the wafer through the machine is 10 minutes (processed by chamber A)+10 minutes (waiting for chamber B)+20 minutes (processed in chamber B).

In some implementations, a machine may include several chambers or sub-systems that may each perform a same set of steps to process wafers in parallel. The capacity of a machine that has parallel sub-systems is defined as the maximum average rate at which the machine, using all its sub-systems, to process the wafers. For example, a machine may have two chambers A and B that are capable of performing a same set of steps to process wafers in parallel, where chambers A can process 10 wafers per hour, and chamber B can process 20 wafers per hour. Then the average machines capacity is 10+20=30 wafers per hour, or one wafer every two minutes.

A machine may have both serial chambers and parallel chambers. In this case, the capacity of the machine is the average time taken by the machine to process wafers, assuming that there are sufficient WIP waiting to be processed, and the machine works at its maximum efficiency with all chambers.

The manufacturing simulator is a software application implemented on a computer system, either as part of the MES or as an external software package to the MES, to mimic the operation of the manufacturing process in the manufacturing plant. The simulator can be a discrete-event driven simulation software, in which discrete events are generated and processed by a computer to produce a simulation result. For example, an event can be wafers or wafer lots arriving at a machine, wafers or wafer lots that start being processed by a machine, wafers or wafer lots that finish being processed by a machine, or wafers or wafer lots that exit a machine to go to a next machine, etc. An event may also be a machine or machines that are down, a machine or machines that are up, etc.

The simulator is not necessarily a discrete-event driven simulation software. It may use the number of wafers or wafers lots in front of a group of machines, and the number of available machines and machine capacity, to compute the number of wafers or wafer lots processed.

The simulator may use the capacity function C(M, S, P) which specifies the amount of time a particular machine M takes to process a particular step S of a particular product P. The simulator may use this information to decide how much time a particular machine needs to devote to a wafer or wafers or wafer lots and generate a production plan for the FAB.

The capacity function C(M, S, P) may be obtained from the specification of the machine, or may be obtained from the action taken, or may be estimated from the operating the machine performs, or may be measured from past production statistics, such as when a wafer enters the machine and when a wafer leaves the machine, and what is the time difference between two consecutive wafers leaving the machine, etc.

In some implementations, the capacity functions are specified in terms of parameters characterizing the machines without taking into consideration other factors. However, in real applications, factors other than those characterizing the machines may also influence the efficiencies of the machine utilization. For example, machines tend to operate more efficiently when the number of wafers or wafer lots (referred to as work-in-process (WIP)) waiting before the machine is high based on a number of reasons. For example, when the WIP in front of a machine is high, the number of wafers available to the same step S and product P is high. Therefore, the machine may continuously process the same step S for product P for a longer time, before changing to a different step or a different product, thus saving the extra time normally required to adjust the machine when changing to a different step or a different product. For another example, in manual plants or semi-automatic plants, high WIP motivates the operators of the machines to work more efficiently, thus resulting in more efficient operation of the machines.

In addition to the capacity function C(M, S, P), the simulator may use the elapsed time function T(M, S, P) to perform simulation, where T(M, S, P) specifies the amount of time a wafer, or a wafer lot, of a particular step S of a particular product P that is processed by a machine M. The simulator may use this information to decide how much time a wafer or wafer lot is with a machine. The unit for T(M, S, P) may be minutes or days, or other time units.

To further improve the simulation accuracy of a manufacture plant, implementation of the disclosure provides systems and methods that can calculate an augmented capacity function and an augmented elapsed time function for each machine, where the augmented functions take into consideration parameters characterizing the machine and other actors beyond the machine, and simulate the operation of the plant using the augmented functions.

In particular, implementations of the disclosure introduce another variable W representing the WIP waiting in front of the machine, to form a WIP-dependent capacity function, which is the augmented capacity function: C(M, S, P, W). The function C(M, S, P, W) specifies the capacity of machine M to process step S of product P, when the WIP waiting in front of the machine is W. For different W, C(M, S, P, W) may be different. In one implementation, the capacity function may indicate that the higher the WIP, the more efficiently the machines run. In other implementations, the function may allow arbitrary relation between W and C, either C increasing on W, or decreasing on W, or non-monotone on W. If recipe R is used to uniquely identify the process, the augmented capacity function may be C(M, R, W), where M is the machine, R is the recipe, and W is the WIP waiting in front of M.

Implementations of the disclosure may further introduce another variable W representing the WIP waiting in front of the machine, to form a WIP-dependent elapsed time function, which is the augmented elapsed time function: T(M, S, P, W). The function T(M, S, P, W) specifies the elapsed time of a wafer or a wafer lot of step S of product P by machine M, when the WIP waiting in front of the machine is W. For different W, T(M, S, P, W) may be different. If recipe R is used to uniquely identify the process, the augmented elapsed time function may be T(M, R, W), where M is the machine, R is the recipe, and W is the WIP waiting in front of M.

The capacity function is used in the simulation to determine the number of wafers or wafer lots each machine may process per unit time. The elapsed time function is used in the simulation to determine the amount of time each wafer or wafer lot spend inside a machine. The simulation may need both functions to mimic the machine behavior and the wafer or wafer lot behavior during processing.

Figure 4:
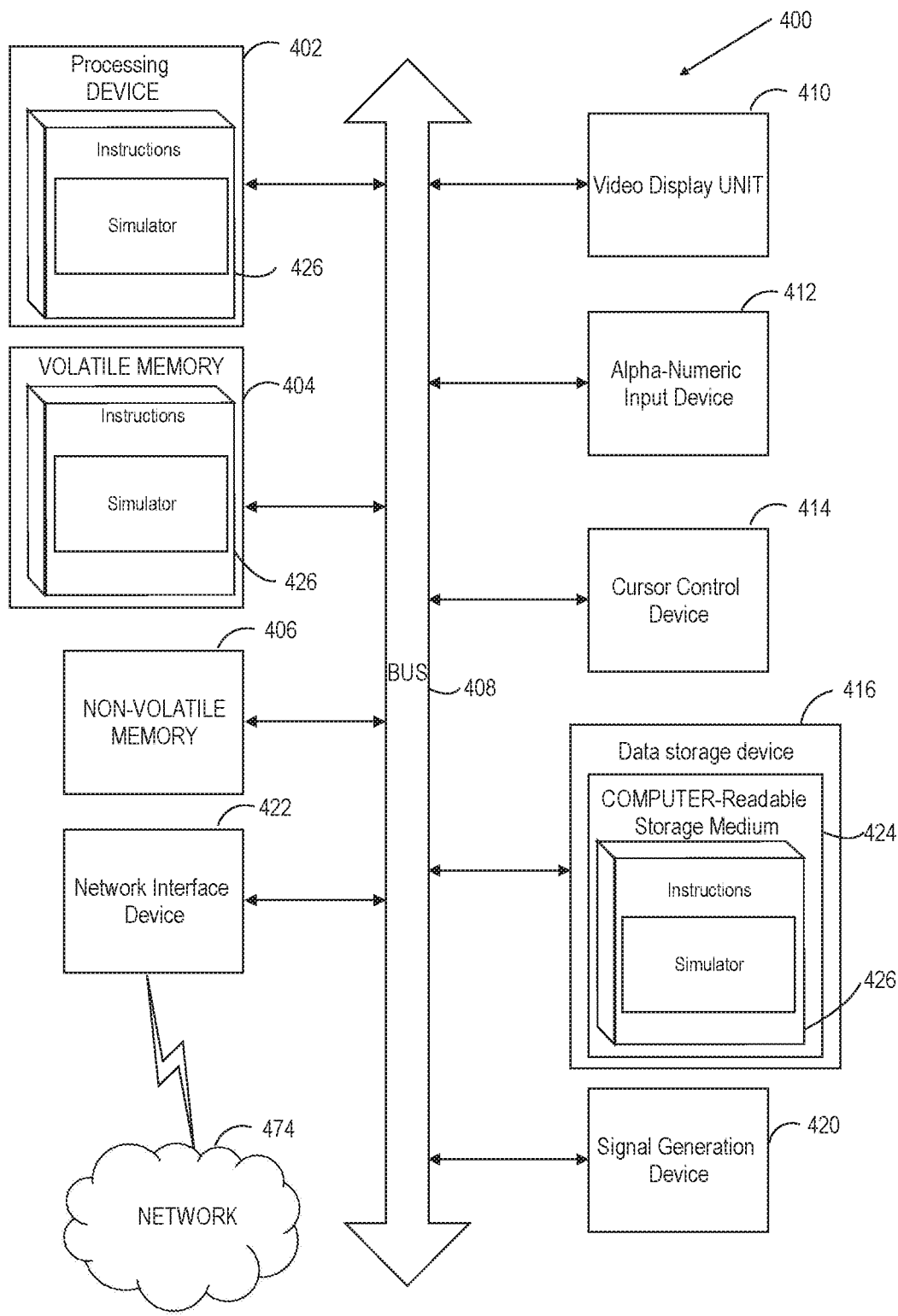
FIG. 4 depicts a block diagram of a computer system operating in accordance with one or more aspects of the present disclosure.

FIG. 1 illustrates a system that employs the augmented capacity functions to simulate a semiconductor manufacture plant according to an implementation of the disclosure. Plant 100 may include multiple machines (e.g., M1-M8) for processing and producing semiconductor products (e.g., integrated circuits). Plant 100 may further include a manufacture execution system (MES) 102 that may receive and execute production plans including commands for controlling the operations of these machines M1-M8. MES 102 can include a computer system (as shown in FIG. 4) including a processing device (e.g., a central processing unit (CPU)). MES 102 may include or otherwise be associated with a storage device 104 for storing information used by MES 102. The information stored in storage device 104 may include tables containing the current states of plant 100. The current states may include, but not limited to, historical production data of wafers or wafer lots waiting for processing (WIP) at different machines and the processing steps being performed by the machine.

Storage device 104 may also store capacity functions (C1-C8) that each represent the production capacity of a corresponding one of the machines (M1-M2). As described above, the capacity functions may be defined by a set of parameters characterizing the machine such as, for example, (M, S, P) or (M, R).

In one implementation, the MES 102 (or a computer system) may include a processing device to execute a simulator 106 that may simulate the operation of machines M1-M8 and generate a production plan for the plant 100 based on the simulation results. The production plan may include a schedule to provide part supplies to plant 100 and the expected output from plant 100. The production plan may help run plant 100 or the whole supply chain more efficiently. Alternatively, the simulator 106 may provide the simulation results to FAB operators who in turn may make decisions and issue the production plan.

In some implementations, simulator 106 may employ capacity functions (C1-C8) to mimic the operations of machines (M1-M8) to generate the production plan. To further improve the simulation accuracy, simulator 106 may further calculate augmented capacity functions based on the capacity functions (C1-C8) and historical production data indicating WIPs waiting to be processed at different machines. The augmented capacity functions may capture the parameters characterizing machines and factors beyond these parameters, thus further improving the simulation accuracy.

Figure 2:
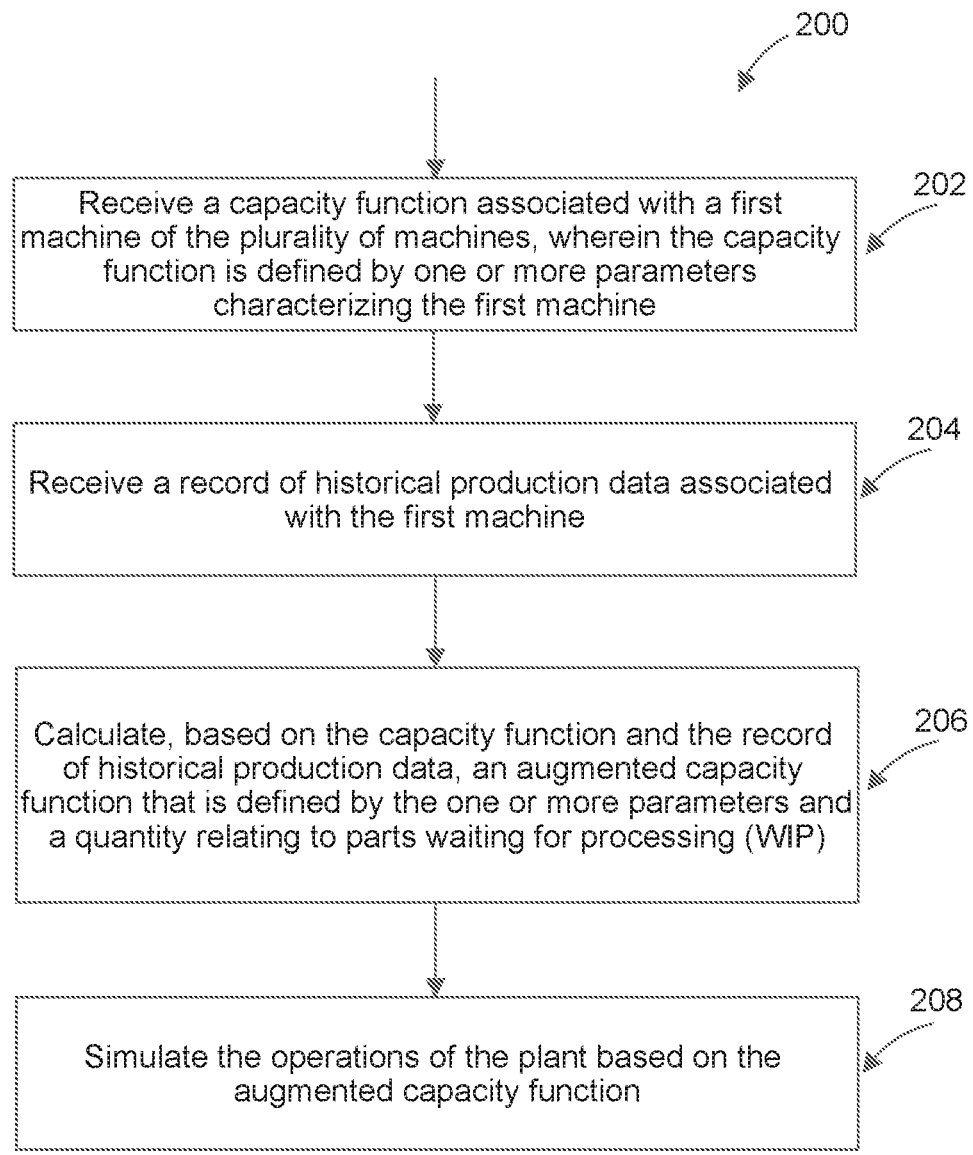
FIG. 2 is a flow diagram of a method to perform a plant simulation using augmented capacity functions according to an implementation of the disclosure.

FIG. 2 is a flow diagram of a method 200 to perform a plant simulation using augmented capacity functions according to an implementation of the disclosure. Method 200 may be performed by processing devices that may comprise hardware (e.g., circuitry, dedicated logic), computer readable instructions (e.g., run on a general-purpose computer system or a dedicated machine), or a combination of both. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a processing device of MES 102 as shown in FIG. 1 or a processing device 402 as shown in FIG. 4.

Referring to FIG. 2, at 202, the processing device may receive capacity functions associated with machines including a capacity function C1 represents the capacity of machine M1, wherein the capacity function is defined by one or more parameters characterizing the first machine. The parameters characterizing the machine can be (M, S, P) or (R, P).

At 204, the processing device may further receive a record of historical production data associated with the first machine. The record of historical data may be stored in a storage device (e.g., storage 104), and the historical data may include historical information relating to WIPs waiting for processing by machine M1.

To further improve the simulation accuracy, at 206, the processing device may calculate, based on the capacity function and the record of historical production data, an augmented capacity function that is defined by the one or more parameters and a quantity relating to parts waiting for processing (WIP). A detailed description of how to calculate the augmented capacity function is given in later sections.

At 208, the processing device may simulate the operations of the plant based on the augmented capacity function, and use the simulation results to generate a production plan for the plant. The augmented capacity function may help improve the accuracy of the simulation results and generate the production plan that may run the plant more efficiently.

The augmented capacity function C(M, S, P, W) may be computed from the historical data. In one implementation, WIPs are considered in terms of two levels as "high" or "low." An average WIP value, during a time period (e.g., a day), is considered as "high" if the WIP value is above or equal to a threshold value; otherwise, the average WIP value is considers as "low." The historical data may be divided into two subsets, one for days of "high" and one for days of "low." Then, for each M, S and P, the processing device may calculate the average capacity of machine M to process step S for product P, where the average is taken over all data in the "high" subset, to derive the value of C(M, S, P, W="high"). Repeat the procedure for the set of "low" data to derive the value of C(M, S, P, W="low").

Similarly, the augmented elapsed time function T(M, S, P, W) may be computed from the historical data as well. In one implementation, WIPs are considered in terms of two levels as "high" or "low." An average WIP value, during a time period (e.g., a day), is considered as "high" if the WIP value is above or equal to a threshold value; otherwise, the average WIP value is considers as "low." The historical data may be divided into two subsets, one for days of "high" and one for days of "low." Then, for each M, S and P, the processing device may calculate the average elapsed time of a wafer or a wafer lot of step S for product P by machine M, where the average is taken over all data in the "high" subset, to derive the value of T(M, S, P, W="high"). Repeat the procedure for the set of "low" data to derive the value of T(M, S, P, W="low").

In one implementation, W can be indexed for more than two WIP levels, from $L_1$ to $L_n$, where $L_1<L_2< \ldots <L_n$ are the thresholds, for some positive integer n>2. Then the historical data may be divided into n+1 subsets, for days where WIP<$L_1$, days where $L_1$<=WIP<$L_2$, ..., days where $L_{n-1}$<=WIP<$L_n$ and days where $L_n$<=WIP. Then for each subset of historical data, the capacity maybe derived. The time unit for defining WIP level may be one day, or several days, or one hour, or several hours.

In one implementation, the augmented capacity function may be stored as a 4-dimensional table C(M, S, P, W), where M, S, P, and W are indices, and the table entry is the capacity value. The capacity value represents either the number of wafers or lots per unit time, or the time taken to process one wafer or one lot. The values for M, S, and P indices are discrete, while the value for W index may be an integer value, or a floating-point value, or an interval.

Similarly, in one implementation, the augmented elapsed time function may be stored as a 4-dimensional table T(M, S, P, W), where M, S, P, and W are indices, and the table entry is the elapsed time.

In one implementation, the augmented capacity function may be stored as a 3-dimensional table C(M, R, W) where M, recipe R, and W are indices associated with machines, recipes, and WIPs, and the table entry is the capacity value. Similarly, the capacity value represents either the number of wafers or lots per unit time, or the time taken to process a wafer or a lot. The values for M, and R indices can be discrete values, while the value for W index may be an integer value, or a floating-point value, or an interval.

In one implementation, the augmented elapsed time function may be stored as a 3-dimensional table T(M, R, W) where M, recipe R, and W are indices associated with machines, recipes, and WIPs, and the table entry is the elapsed time.

In one implementation, instead of storing the augmented capacity function directly, the capacity function may be stored indirectly through ratio functions with respect to the capacity function. The processing device may calculate the ratio $r_4$(M, S, P, W)=C(M, S, P, W)/C(M, S, P), where the augmented capacity function C(M, S, P, W) is the WIP-dependent capacity, and C(M, S, P) is the WIP-independent capacity. In this implementation, a 4-dimensional table for $r_4$(M, S, P, W) is stored, and C(M, S, P) is also stored but C(M, S, P, W) is not. Values of C(M, S, P, W) may be calculated by $r_4$(M, S, P, W)*C(M, S, P).

In one implementation, the processing device may calculate the ratio $t_4$(M, S, P, W)=T(M, S, P, W)/T(M, S, P). In this implementation, a 4-dimensional table for $t_4$(M, S, P, W) is stored, and T(M, S, P) is also stored. Values of T(M, S, P, W) may be calculated by $t_4$(M, S, P, W)*T(M, S, P).

In one implementation, the processing device may calculate ratio $r_3$(M, R, W)=C(M, R, W)/C(M, R), where augmented capacity function C(M, R, W) is WIP-dependent capacity, C(M, R) is WIP-independent capacity, and R is recipe. In this implementation, a 3-dimensional table for $r_3$(M, R, W) is stored, and C(M, R) is also stored but C(M, R, W) is not. Values of C(M, R, W) may be calculated by $r_3$(M, R, W)*C(M, R).

In one implementation, the processing device may calculate the ratio $t_3$(M, R, W)=T(M, R, W)/T(M, R). In this implementation, a 3-dimensional table for $t_3$(M, R, W) is stored. Values of T(M, R, W) may be calculated by $t_4$(M, R, W)*T(M, R).

In one implementation, the processing device may calculate ratio $r_2$(M, W)=average {C(M, S, P, W)/C(M, S, P)}, where the average is over all step S and product P. In this implementation, a 2-dimensional table for $r_2$(M, W) is stored, and C(M, S, P) is also stored but C(M, S, P, W) is not. Values of C(M, S, P, W) may be approximated by $r_2$(M, W)*C(M, S, P). In one implementation, the average may be calculated by (sum of C(M, S, P, W) over all S and P)/(sum of C(M, S, P) over all S and P).

In one implementation, the processing device may calculate ratio $t_2$(M, W)=average{T(M, S, P, W)/T(M, S, P)}, where the average is over all step S and product P. In this implementation, a 2-dimensional table for $t_2$(M, W) is stored, and T(M, S, P) is also stored. Values of T(M, S, P, W) may be approximated by $t_2$(M, W)*T(M, S, P). In one implementation, the average may be calculated by (sum of T(M, S, P, W) over all S and P)/(sum of T(M, S, P) over all S and P).

In one implementation, the processing device may calculate ratio $r_1$(W)=average {C(M, S, P, W)/C(M, S, P)}, where the average is over all machine M, step S and product P. In this implementation, a 1-dimensional table for $r_1$(W) is stored, and C(M, S, P) is also stored but C(M, S, P, W) is not. Values of C(M, S, P, W) may be approximated by $r_1$(W)*C(M, S, P). The above average may be calculated as (sum of C(M, S, P, W) over all M, S and P)/(sum of C(M, S, P) over all M, S and P).

In one implementation, the processing device may calculate ratio $t_1$(W)=average{T(M, S, P, W)/T(M, S, P)}, where the average is over all machine M, step S and product P. In this implementation, a 1-dimensional table for $t_1$(W) is stored, and T(M, S, P) is also stored. Values of T(M, S, P, W) may be approximated by $t_1$(W)*T(M, S, P). In one implementation, the above average may be calculated by (sum of T(M, S, P, W) over all M, S and P)/(sum of T(M, S, P) over all M, S and P).

In one implementation, the processing device may calculate ratio $r_1$(W)=average {C(M, R, W)/C(M, R)}, where the average is over all machine M, and recipe R. In this implementation, a one-dimensional table for $r_1$(W) is stored, and C(M, R) is also stored but C(M, R, W) is not. Values of C(M, R, W) may be approximated by $r_1$(W)*C(M, R). The above average may be calculated as (sum of C(M, R, W) over all M, R)/(sum of C(M, R) over all M, R).

In one implementation, the processing device may calculate ratio $t_1$(W)=average{T(M, R, W)/T(M, R)}, where the average is over all machine M and recipe R. In this implementation, a 1-dimensional table for $t_1$(W) is stored, and T(M, R) is also stored. Values of T(M, R, W) may be approximated by $t_1(W)*T(M, R)$. In one implementation, the above average may be calculated by (sum of $T(M, R, W)$ over all M and R)/(sum of $T(M, R)$ over all M and R).

Using $r_4$, $r_3$, $r_2$ to $r_1$, and $t_4$, $t_3$, $t_2$ to $t_1$, may reduce the storage space required to store the augmented functions at the expense of increasing the approximation error for $C(M, S, P, W)$ and $T(M, S, P, W)$. One of these approaches may achieve a good tradeoff between memory storage and accuracy for a specific implementation.

The simulator may use capacity function $C(M, S, P, W)$, which is stored directly or approximated by any method including ones described above, to perform the simulation. When wafers or a lot arrives at a machine, the simulator will search the function according to M, S, P and the W, to determine how much time M should spend to process the wafers or the lot. After spending the amount of time specified by $C(M, S, P, W)$ for a wafer or wafer lot, machine M may process the next wafer or wafer lot.

The simulator may use elapsed time function $T(M, S, P, W)$, which is stored directly or approximated by any methods including the ones described above, to perform the simulation. When a wafer or a wafer lot arrives at a machine, the simulator may search the function according to each of M, S, P and the W, to determine how much time the wafer or wafer lot will stay inside of M. After staying the amount of time specified by $T(M, S, P, W)$, the simulator may simulate the wafer or wafer lot to exit M and proceed to the next step.

The simulator may use capacity function $C(M, R, W)$, which is stored directly or approximated by any method including ones described above, to perform the simulation. When wafers or a lot arrives at a machine, the simulator will search the function according to M, R and the W, to determine how much time M should spend to process the wafers or the lot.

The simulator may use elapsed time function $T(M, R, W)$, which is stored directly or approximated by any methods including ones described above, to perform the simulation. When a wafer or a wafer lot arrives at a machine, the simulator will search the function according to each of M, R and the W, to determine how much time the wafer or wafer lot will stay inside of M.

The capacity may be computed from historical information. In one implementation, historical event may be provided as a number of (TIME, LOTID, PRODUCTID, STEP, EQPID, EVENT) lines, where the fields may not necessarily be in the order and the fields may not necessarily use these names, where TIME is time the event happens, LOTID is a unique ID for a lot involved in the event, PRODUCTID is a unique product ID for the lot, STEP is the unique step ID of the process, EQPID is the unique ID for the equipment (machine) that processes the lot, and EVENT maybe "process_start" or "process_end".

If a machine does not include pipeline, then the elapsed time between "process_start" and "process_end" of a LOTID with EQPID=M, STEP=S, PRODICTID=P provides an instance of capacity $C(M, S, P)$. Averaging instances of $C(M, S, P)$ over all LOTIDs with the same M, S and P in the history file provides the capacity function $C(M, S, P)$.

If a machine has an internal pipeline, the time taken by the machine M to process LOTID may be defined as the minimum of $\{T_1, T_2\}$, where $T_1$ is the time between "process_start" and "process_end" of the LOTID as described above. Value $T_2$ is the time difference between "process_end" of the LOTID, with EQPID=M, PRODUCTID=P and STEP=S, and the most recent "process_end" of a lot. Averaging over all instances of LOTID of the same M, S, and P in the history file provides the capacity function $C(M, S, P)$.

If a machine has both internal pipelined sub-systems and parallel sub-systems, the capacity $C(M, S, P)$ may be estimated by averaging the time between consecutive "process_end", over all LOTID with the same M, S, and P.

The capacity may be computed by summing all time when a machine is "busy" or "processing" from the history file, over a time period, and then dividing the time by the number of wafers or lots processed the machine during the same time period.

In one implementation, machines may be grouped. Machines that process the same step S of product P may form an equipment group. The machine M in $r_4$, $r_3$, $r_2$, and $r_1$ may be equipment group. In one implementation, machine M in $r_4$, $r_3$, $r_2$ and $r_1$ may be subsets of an equipment group that have similar performance.

Figure 3:
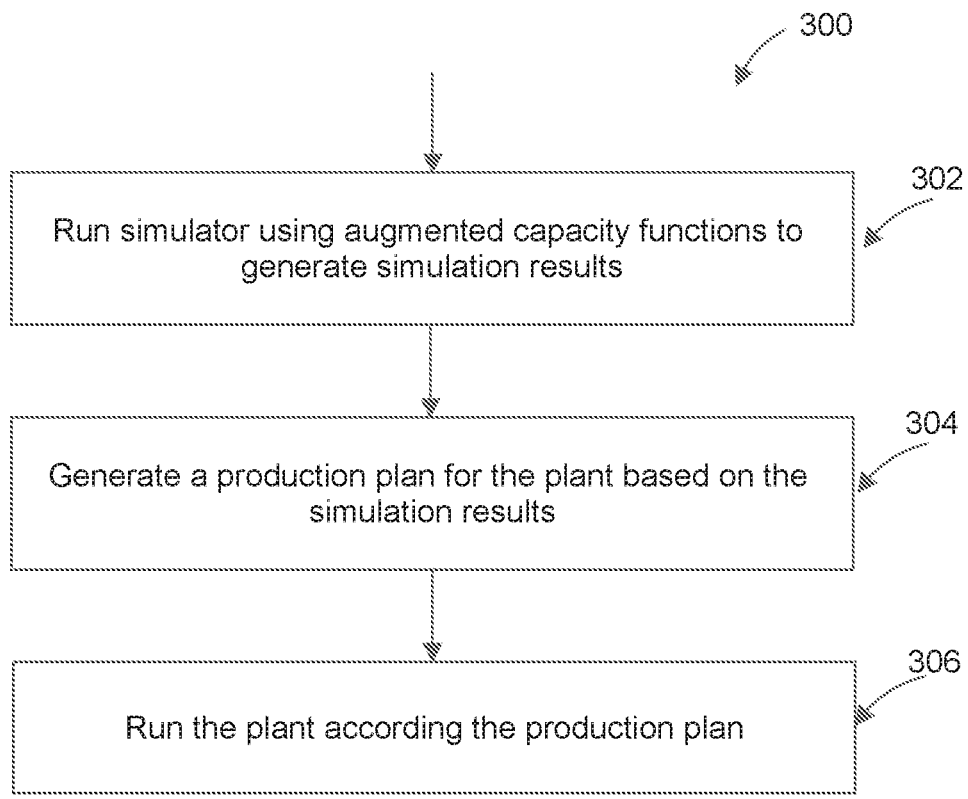
FIG. 3 is a flow diagram of a method to use the improved simulation results to run a plant according to an implementation of the disclosure.

FIG. 3 is a flow diagram of a method 300 to use the improved simulation results to run a plant according to an implementation of the disclosure. Referring to FIG. 3, at 302, the processing device may run a simulator including the augmented capacity functions to generate simulation results. The simulation may include simulation of machines (or groups of machines) to process wafers (or wafer lots) through different steps. Implementations of the present disclosure provide a technical solution that includes a system and method to model the time taken by machines to process wafers or lots, at different steps to achieve the overall accurate simulation of the semiconductor manufacture plant, where the processing device is a hardware processor ("controller") to simulate the operation of the semiconductor plants. The results of 302 may be read by a FAB operator to make decisions on FAB operation.

The simulation can be a discrete-event driven computer simulation, in which discrete events are fed into a computer model to generate the outcome. In this application, the events can be WIPs delivered to a machine at a particular time, the model may include the groups of machines (and their capacities) applied to different products and steps.

The simulation can be flow-like computer simulation, in which flows of wafers are fed into group of machines to generate the outcome. In this application, a certain amount of WIPs are delivered to a machine group, and after a certain time period, some WIPs are processed and move to the next machine group.

At 304, the processing device may further generate a production plan for the plant based on the improved simulation results.

At 306, the processing device may run the plant according to the production plan.

FIG. 4 depicts a block diagram of a computer system operating in accordance with one or more aspects of the present disclosure. In various illustrative examples, computer system 400 may correspond to a computing device within MES.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alpha-numeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions encoding simulator of FIG. 1 for implementing the disclosed method in FIG. 2.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method to simulate operations of a manufacture plant that fabricates semiconductor products using a series of manufacture steps, the method comprising a plurality of machines, the method comprising:

receiving, by a processing device, a capacity function associated with a first machine of the plurality of machines, wherein the capacity function is defined by one or more parameters characterizing the first machine;

receiving, by the processing device, a record of historical production data associated with the first machine;

calculating, by the processing device based on the capacity function and the record of historical production data, an augmented capacity function that is defined by the one or more parameters and a quantity relating to parts waiting for processing (WIP), wherein the quantity relating to WIP comprises at least three levels of WIPs, the at least three levels comprising a high level and a low level, and wherein the record of historical production data associated with the first machine comprises the high level corresponding to a first period of time associated with a first number of WIPs greater than or equal to a determined threshold and the low level corresponding to a second period of time associated with the low level of WIPs associated with a second number of WIPs smaller than to the determined threshold;

simulating, by the processing device, the operations of the plant based on the augmented capacity function to generate a simulation result;

generating, by the processing device, a production plan for the manufacture plant; and running the manufacture plant according to the production plan.

2. The method of claim 1, further comprising:

receiving an elapsed time function associated with the first machine, wherein the elapsed time function measures a time period a part stays with the first machine while being processed;

calculating, based on the elapsed time function and the record of historical data, an augmented elapsed time function that is defined by the one or more parameters and a quantity relating to parts waiting for processing (WIP);

simulating the operations of the plant based on the augmented capacity function and the augmented elapsed time function; and generating the production plan for the manufacture plant, wherein the production plan comprises at least one of a schedule of parts shipped to the plant, a throughput by the plant, or maintenance schedule of the plurality of machines.

3. The method of claim 1, wherein the capacity function is measured in terms of one of a number of parts processed per a time unit, a first time period to process a part, or a second time period to process a lot of parts.

4. The method of claim 1, wherein the one or more parameters characterizing the first machine comprise an identifier (M) of the first machine, a product (P) processed by the first machine, and a manufacture step (S) employed in processing the product.

5. The method of claim 1, wherein the one or more parameters characterizing the first machine comprise an identifier (M) of the first machine and a recipe (R) for processing a product, and wherein the recipe (R) uniquely defines a product (P) and a plurality of steps to process the product (P).

6. The method of claim 1, wherein calculating, by the processing device based on the record of historical production data, an augmented capacity function that is defined by the one or more parameters and a quantity relating to parts waiting for processing (WIP) comprises:

calculating an average capacity function value for the high level of WIPs and the low level of WIPs.

7. The method of claim 6, further comprising:

calculating a ratio function of the augmented capacity function over the capacity function; and storing the ratio function in a storage device.

8. A non-transitory machine-readable storage medium storing instructions which, when executed, cause a processing device to simulate operations of a manufacture plant that fabricates semiconductor products using a series of manufacture steps, the processing device to:

receive a capacity function associated with a first machine of the plurality of machines, wherein the capacity function is defined by one or more parameters characterizing the first machine;

receive a record of historical production data associated with the first machine;

calculate, based on the capacity function and the record of historical production data, an augmented capacity function that is defined by the one or more parameters and a quantity relating to parts waiting for processing (WIP), wherein the quantity relating to WIP comprises at least three levels of WIPs, the at least three levels comprising a high level and a low level, and wherein the record of historical production data associated with the first machine comprises the high level corresponding to a first period of time associated with a first number of WIPs greater than or equal to a determined threshold and the low level corresponding to a second period of time associated with the low level of WIPs associated with a second number of WIPs smaller than to the determined threshold;

simulate the operations of the plant based on the augmented capacity function;

generate a production plan for the manufacture plant; and run the manufacture plant according to the production plan.

9. The non-transitory machine-readable storage medium of claim 8, wherein the processing device is further to:

receive an elapsed time function associated with the first machine, wherein the elapsed time function measures a time period a part stays with the first machine while being processed;

calculate, based on the elapsed time function and the record of historical data, an augmented elapsed time function that is defined by the one or more parameters and a quantity relating to parts waiting for processing (WIP);

simulate the operations of the plant based on the augmented capacity function and the augmented elapsed time function; and generate the production plan for the manufacture plant, wherein the production plan comprises at least one of a schedule of parts shipped to the plant, a throughput by the plant, or maintenance schedule of the plurality of machines.

10. The non-transitory machine-readable storage medium of claim 8, wherein the capacity function is measured in terms of one of a number of parts processed per a time unit, a first time period to process a part, or a second time period to process a lot of parts.

11. The non-transitory machine-readable storage medium of claim 8, wherein the one or more parameters characterizing the first machine comprise an identifier (M) of the first machine, a product (P) processed by the first machine, and a manufacture step (S) employed in processing the product.

12. The non-transitory machine-readable storage medium of claim 8, wherein the one or more parameters characterizing the first machine comprise an identifier (M) of the first machine and a recipe (R) for processing a product, and wherein the recipe (R) uniquely defines a product (P) and a plurality of steps to process the product (P).

13. The non-transitory machine-readable storage medium of claim 8, wherein to calculate, based on the record of historical production data, an augmented capacity function that is defined by the one or more parameters and a quantity relating to parts waiting for processing (WIP), the processing device is further to calculate an average capacity function value for the high level of WIPs and the low level of WIPs.

14. The non-transitory machine-readable storage medium of claim 13, wherein the processing device is further to:

calculate a ratio function of the augmented capacity function over the capacity function; and store the ratio function in a storage device.

15. A system to simulate operations of a manufacture plant comprising a plurality of machines to fabricate semiconductor products using a series of manufacture steps, comprising:

a storage device to store a historical production data; and a processing device, communicatively coupled to the storage device, to:

receive a capacity function associated with a first machine of the plurality of machines, wherein the capacity function is defined by one or more parameters characterizing the first machine;

receive a record of historical production data associated with the first machine;

calculate, based on the capacity function and the record of historical production data, an augmented capacity function that is defined by the one or more parameters and a quantity relating to parts waiting for processing (WIP), wherein the quantity relating to WIP comprises at least three levels of WIPs, the at least three levels comprising a high level and a low level, and wherein the record of historical production data associated with the first machine comprises the high level corresponding to a first period of time associated with a first number of WIPs greater than or equal to a determined threshold and the low level corresponding to a second period of time associated with the low level of WIPs associated with a second number of WIPs smaller than to the determined threshold;

simulate the operations of the plant based on the augmented capacity function;

generate a production plan for the manufacture plant; and run the manufacture plant according to the production plan.

16. The system of claim 15, wherein the processing device is further to:

receive an elapsed time function associated with the first machine, wherein the elapsed time function measures a time period a part stays with the first machine while being processed;

calculate, based on the elapsed time function and the record of historical data, an augmented elapsed time function that is defined by the one or more parameters and a quantity relating to parts waiting for processing (WIP);

simulate the operations of the plant based on the augmented capacity function and the augmented elapsed time function; and generate the production plan for the manufacture plant, wherein the production plan comprises at least one of a schedule of parts shipped to the plant, a throughput by the plant, or maintenance schedule of the plurality of machines.

* * * * *